Jan. 10, 1967 A. IMHOF 3,297,048
SAFETY VALVE
Filed Oct. 10, 1963
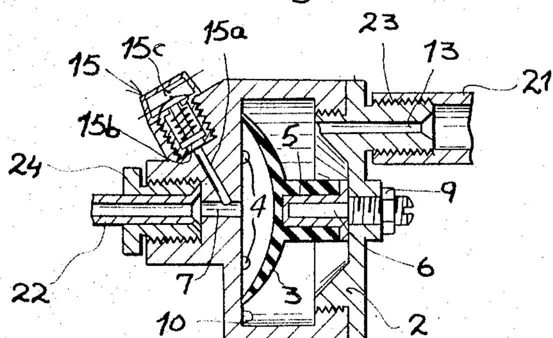
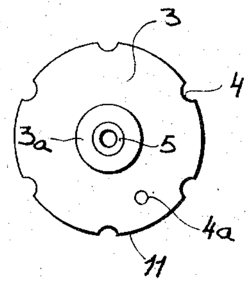
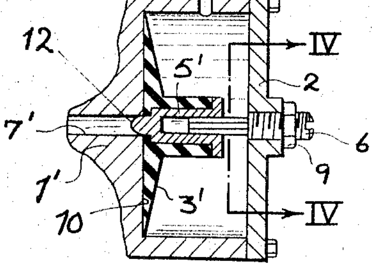
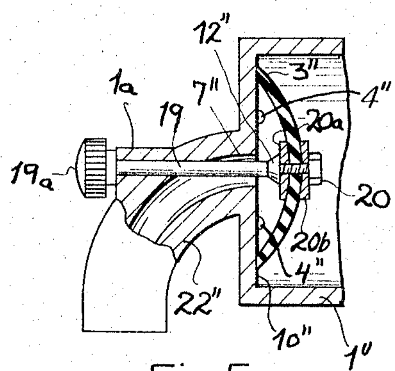
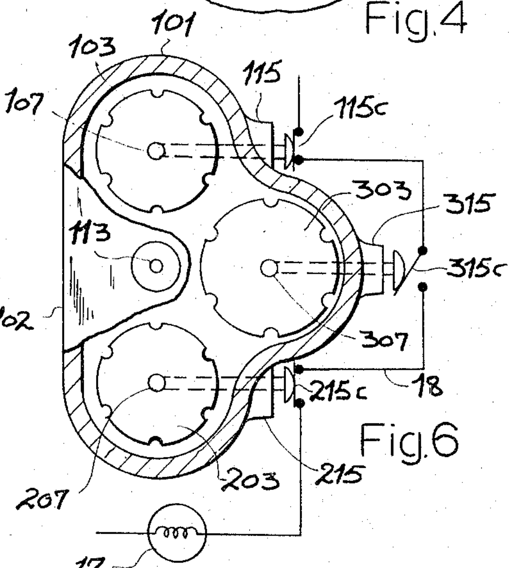
INVENTOR:
AUGUSTIN IMHOF
BY
Mestern, Ross & Mestern United States Patent Office 3,297,048
Patented Jan. 10, 1967

1

3,297,048
SAFETY VALVE
Augustin Imhof, Welschensteinach, Kreis Wolfach, Germany
Filed Oct. 10, 1963, Ser. No. 315,292
14 Claims. (Cl. 137—512)

My present invention relates to a safety valve for a fluid line forming part of a hydraulic or pneumatic system in which a main conduit supplies air, oil or some other fluid under pressure to a plurality of branch conduits in parallel. The invention is, however, also applicable to a fluid line with only a single outlet conduit supplied from an inlet conduit.

Typical for the first-mentioned kind of system is a hydraulic brake system for automotive vehicles in which a supply conduit from a master cylinder feeds two or more branch conduits leading to individual brake cylinders. If a leak develops in one of the branch conduits, the resulting drop in pressure is communicated to all the other branch conduits so that effective braking action becomes impossible even with cylinders connected to intact branch lines. An important object of my invention is, therefore, to provide a safety valve adapted to isolate a defective branch of such hydraulic brake system so that the vehicle can still be brought to a stop by the brake cylinder or cylinders associated with another branch or other branches of the hydraulic circuit.

A related object is to provide means in such system for indicating the defective condition of a branch so that repairs can promptly be instituted.

It is also an object of my invention to provide a safety valve of the character referred to which is designed to respond only to a predetermined minimum pressure difference thereacross so that fluid can be supplied at a reduced rate from an inlet conduit to an outlet conduit even when the latter is under a pressure somewhat lower than that of the supply source, as by communicating with the atmosphere while the supply pressure is above atmospheric. A valve of this type, useful for example in the reintroduction of brake fluid into a previously drained brake cylinder and its branch conduit, can also serve as a means for limiting the outflow of liquid from a supply line, e.g. at a water tap.

A more particular object of my invention is to provide means for maintaining the operating member of a safety valve in a blocking position even after cessation of the pressure differential responsible for the blocking action, thereby minimizing the loss of fluid upon repeated application of pressure to a leaky hydraulic or pneumatic system.

The former objects are realized, in accordance with my present invention, by the provision of a valve chamber with an inlet port and at least one outlet port separated by a generally cup-shaped membrane of resilient material (e.g. rubber or plastic), the outlet port being provided in a chamber wall which forms a seat for the membrane. The latter is fashioned with one or more cutouts which normally enable communication between the two ports but are so positioned as to become obstructed by the valve seat upon a partial deflection of the membrane in response to an abnormal pressure differential.

According to a more specific feature of my invention, the cutouts are in the form of peripheral recesses which block the communication between the two ports as soon as a marginal zone of the membrane is pressed against the valve seat. It is desirable to provide the membrane with a bleeder aperture disposed inwardly of these peripheral cutouts so as to become blocked only in response to a substantially higher pressure differential, the bleeder aperture thus enabling equalization of fluid pressure on both

2 sides of the membrane if only a minor leakage has developed in the conduit attached to the outlet port.

The presence of the membrane facilitates the use of pressure-sensitive switches or the like in communication with the outlet port for operating an indicator lamp or other alarm devices to signal the fact that the membrane occupies a blocking position in which the application of pressure to the inlet port has substantially no effect upon the outlet port and on the pressure-sensitive means connected therewith.

A further feature of my invention resides in the provision of means for positively guiding the center of the membrane in its motion toward and away from the associated outlet port. The guide means includes an axially directed extension at the center of the membrane which may be directed either rearwardly, i.e. beyond the convex membrane surface, or forwardly, i.e. from the concave membrane surface toward the outlet port. In the latter case, the extension is advantageously a stem passing outwardly from the chamber housing by way of the outlet port so as to enable manual resetting of the membrane to a nonblocking position after the membrane had been flattened against its seat.

Another advantageous feature of my invention is the provision of a plug at the center of the membrane, this plug fitting tightly into the outlet port upon a flattening of the membrane so as to be frictionally retained in that port and to prevent the restoration of the membrane to its normal concave shape by virtue of its own resiliency. The plug, which can be rigid with the aforementioned axial guiding extension of the membrane, may be dislodged from its port by a pin or the like when the valve is disconnected from the fluid line for inspection or repair.

My invention will be described in greater detail with reference to the accompanying drawing in which:

FIG. 1 is a cross-sectional view of a safety valve embodying the invention;

FIG. 2 is a face view of a membrane forming part of the valve of FIG. 1;

FIG. 3 is a view similar to FIG. 1, showing a modification;

FIG. 4 is a fragmentary cross-sectional view on the line IV—IV of FIG. 3, drawn to a larger scale;

FIG. 5 is a fragmentary cross-sectional view similar to FIGS. 1 and 3, illustrating a further modification; and FIG. 6 is an end view (parts broken away) of a safety valve with several membranes according to the invention.

The safety valve shown in FIG. 1 comprises a housing 1 and a cover 2 together defining a valve chamber. A resilient membrane 3 (see also FIG. 2), received in this chamber, is generally in the shape of a suction cup and is periphrally provided with a series of notches 4 normally permitting unhindered fluid passage from an inlet port 13 to an outlet port 7. Port 13 is surrounded by a threaded nipple 23 detachably connected with a conduit 21 which leads to a pump or other source of fluid under pressure, specifically a master cylinder of an automotive brake system to which pressure is applied in the usual manner by a brake pedal. A connector 24 screwed into the wall of housing 1 at port 7 serves as a means for attaching thereto a conduit 22 leaning to a load, specifically a brake cylinder at a wheel of an automotive vehicle. Membrane 3 also has a bleeder aperture *4a* at an intermediate location between its center and its periphery 11 with which it bears upon a valve seat 10 formed by the housing wall that contains the port 7.

The center of membrance 3, located opposite port 7, has attached to it a metallic sleeve 5 held in place by a tubular axial extension 3*a* of the membrane, this extension projecting rearwardly from its convex surface. A guide stud 6 is threadedly received in the cover 2 and penetrates into the sleeve 5, the stud being maintained by a counternut 9 in a selected position of adjustment in which it limits the bulging of membrane 3 away from port 7. The pin 6, as more clearly seen in FIGS. 3 and 4, is longitudinally fluted at 8 in order to vent the interior of sleeve 5 toward the chamber formed by housing 1 and cover 2.

FIG. 1 also illustrates the provision of a pressure-sensitive switch 15 connected via a channel 15a with the outlet port 7. The switch is shown to comprise a spring-loaded piston 15b acting upon normally open contacts 15c so as to close them whenever the pressure in channel 15a exceeds the spring force.

In the normal operation of the system of FIGS. 1 and 2, the admission of liquid under pressure through port 13 into the valve chamber will result in the buildup of a like reaction pressure in port 7 so that substantially no pressure differential exists across membrane 3 which, therefore, maintains its normal position. Switch contacts 15c are closed under these circumstances whenever the pressure is applied. If, however, a leak develops in outlet conduit 22, the pressure on the concave side of membrane 3 approaches that of the atmosphere so that a rapid application of fluid pressure (such as occurs when a driver steps on the brake pedal) would deform the membrane 3 to flatten it at least in the region of its rim 11, thereby obstructing the marginal cutouts 4 and substantially blocking communication between ports 13 and 7. If the deformation is insufficient to obstruct the bleeder hole *4a*, e.g. if the conduit 22 has been partly drained by a small leak so that a reaction pressure begins to build up even while the membrane 3 is being flattened, the fluid traversing the hole *4a* will gradually equalize the pressure on both sides of the membrane so that the latter returns to its normal position.

If the application of pressure at port 13 is very gradual, the membrane 3 will not flex enough to obstruct the notches 4 so that even an empty conduit 22 and its associated brake cylinder can be filled with liquid from the master cylinder in this manner.

In FIG. 3, I have shown a modified membrane 3' (here illustrated in its flattened position) which bears at its center a plug 12 fitting tightly in the port 7' so as to prevent the restoration of membrane 3' after the application of pressure has ceased. Plug 12 is here shown to be integral with the metal sleeve 5' slidably guided on the fluted stud 6; as the sleeve 5' is of larger diameter than the port 7', it will prevent the central membrane portion from being sucked into the port. It will be apparent that, in this embodiment as in the preceding one, the setting of stud 6 determines the sensitivity of the valve member 3 or 3' and thus permits adjustment of the pressure differential required to bring about the blocking of port 7 or 7'.

FIG. 3 also illustrates the positioning of an inlet port 14 on the side of the housing 1' rather than on its cover 2 as in the case of port 13 (FIG. 1).

The resiliency of membrance 3 may be so chosen that this membrane will return to normal, even after virtually complete flattening, as soon as the fluid pressure at inlet port 13 or 14 has disappeared or dropped to a predetermined level. It is, however, also possible to make the membrane 3 so pliable and the port 7 so narrow that the membrane will remain in its blocking position even in the absence of the plug 12 as shown in FIG. 3. In this case, as also when the membrane is retained by the plug, resetting of the membrane may be conveniently accomplished by detaching the conduit 22 from the housing 1 and introducing a pin or other blunt elongated implement from without into the port 7 or 7'. As shown in FIG. 5, however, the membrane 3'' may be rigid with such an implement in the form of a stem 19 which is guided in an extension 1a of a valve housing 1''. The outlet port 7'' of housing 1'' is partly traversed by the stem 19 which is secured to the center of membrane 3'' by means of a pair of washers 20a, 20b and a nut 20. Stem 19 also has a frustoconical shoulder 12'' fitting closely inside port 7'' in the manner of plug 12 (FIG. 3) and for the purpose described in connection therewith. A knob 19a on stem 19 is manually depressible to lift the membrane 3'' off its seat 10''.

The port 7'' is here constituted by the bore of a faucet 22'' by which liquid from a water pipe, barrel or other supply source may be dispensed under the control of a spigot (not shown) at the inlet to the valve chamber. When the spigot is "cracked" or opened but slightly, the liquid will flow through the peripheral notches 4'' on membrane 3'' without appreciably deflecting the latter from its normal position; if on the other hand the spigot is opened wide, the resulting pressure differential will flatten the membrane so that only a limited quantity of liquid can be dispensed. The flow can, however, be maintained at a rapid rate as long as knob 19a is manually pressed inwardly. This arrangement, with or without spigot, may therefore serve as a liquid-saving tap useful for example in sanitary installations at locations with limited water supply, e.g. on airplanes.

In FIG. 6 I have shown a housing 101 whose cover 102 has a common inlet 113 for three outlets 107, 207, 307 respectively overlain by membranes 103, 203 and 303. These membranes, which may have any of the construction illustrated in the preceding figures, independently control the admission of fluid from inlet 113 to the several branch lines respectively associated with their outlets 107, 207 and 307. Each of these branch lines is provided with its own pressure-sensitive device 115, 215, 315 similar to switch 15 of FIG. 1, the contacts 115c, 215c, 315c of all these devices being connected in cascade across a source of current, illustrated diagrammatically, in a circuit 18 in series with an indicator lamp 17. In the particular position shown in FIG. 6, in which the membrane 303 has been flattened on account of a defect in its outlet conduit, the switch contacts 315c remain open so that lamp 17 will not light when fluid pressure is applies at port 113. The operator, accordingly, will be apprised of the fact that at least one of the branch lines of the system is not properly supplied with fluid.

The arrangement of FIG. 6 is, of course, representative of any system in which a plurality of membrane-protected outlets are served by a common inlet, the membrane being effective to isolate a loss of pressure occurring in any of the parallel-connected branches.

The control circuit 18 for the alarm device 17 may, of course, be altered in various ways, e.g. with connection of the switch contacts in parallel rather than in series if these contacts are arranged to be closed rather than open in the absence of pressure. This and other modifications, readily apparent to persons skilled in the art, including combinations of compatible features from the several embodiments disclosed, are intended to be embraced within the spirit and scope of my invention as defined in the claims appended hereto.

I claim:

1. A safety valve inserted between two conduits of a fluid line, comprising a valve chamber with two ports respectively connected to said conduits, said chamber having an inner wall forming a seat around one of said ports, a generally cup-shaped membrane of resilient material in said chamber bearing on said seat with its concave side facing one of said ports, said membrane being provided with at least one cutout normally enabling communication between said ports but blocking said communication upon a partial deflection of said membrane against said seat in response to an abnormal pressure differential across said membrane, and guide means extending into said chamber and slidably received in said membrane for centering same relative to said one of said ports.

2. A safety valve inserted between two conduits of a fluid line, comprising a valve chamber with two ports respectively connected to said conduits, said chamber having an inner wall forming a seat around one of said ports, and a generally cup-shaped membrane of resilient material in said chamber bearing on said seat with its concave side facing one of said ports, said membrane being provided with passage means normally enabling communication between said ports but blocking said communication upon a partial deflection of said membrane against said seat in response to an abnormal pressure differential across said membrane, said membrane being provided with an axially directed extension at its center, said chamber being provided with guide means for said membrane slidably engaging said extension.

3. A safety valve as defined in claim 2, further comprising pressure-sensing means in communication with said one of said ports and indicator means controlled by said pressure-sensing means for signaling a blocking position of said membrane.

4. A safety valve as defined in claim 2 wherein said extension is tubular and projects from the convex side of said membrane, said guide means including a stud received in said tubular extension.

5. A safety valve as defined in claim 4 wherein said stud is externally fluted.

6. A safety valve as defined in claim 4 wherein said stud is attached to said housing by adjustable fastening means enabling selection of different limiting positions for said membrane.

7. A safety valve as defined in claim 2 wherein said extension is a stem projecting outwardly from said chamber by way of said one of said ports for enabling manual resetting of said membrane to a nonblocking position.

8. A safety valve as defined in claim 2, wherein said passage means defines a plurality of peripheral cutouts and said membrane is further provided with a bleeder aperture disposed inwardly of said peripheral cutouts.

9. A safety valve inserted between two conduits of a fluid line, comprising a valve chamber with two ports respectively connected to said conduits, said chamber having an inner wall forming a seat around one of said ports, and a generally cup-shaped membrane of resilient material in said chamber bearing on said seat with its concave side facing said one of said ports, said membrane being provided with at least one cutout normally enabling communication between said ports but blocking said communication upon a partial deflection of said membrane against said seat in response to an abnormal pressure differential across said membrane, and a plug carried centrally on said membrane opposite said one of said ports for penetration of the latter and frictional retention therein upon a substantially complete flattening of said membrane against said seat.

10. A safety valve as defined in claim 9 wherein said membrane is provided with an axial extension rigid with said plug, said extension projecting from the convex side of said membrane, said chamber being provided with guide means for said membrane slidably engaging said extension.

11. A safety valve inserted between a main conduit and several branch conduits of a fluid system, comprising a valve chamber with an inlet port and several outlet ports respectively connected to said main and branch conduits, said chamber having an inner wall forming a seat around each of said outlet ports, and a plurality of generally cup-shaped membranes of resilient material in said chamber each bearing on a respective seat with its concave side facing the corresponding outlet port, said membrane being provided with at least one cutout normally enabling communication between said inlet and corresponding outlet ports but blocking said communication upon a partial deflection of said membrane against said respective seat in response to an abnormal pressure differential across said membrane.

12. A safety valve as defined in claim 11 wherein each of said outlet ports is provided with pressure-sensing means individually communicating therewith, further comprising indicator means jointly controlled by all of said pressure-sensing means for signaling a blocking position of any membrane within said chamber.

13. A safety valve inserted between two conduits of a fluid line, comprising a valve chamber with two ports respectively connected to said conduits, said chamber having an inner wall forming a seat around one of said ports, and a generally cup-shaped membrane of resilient material in said chamber bearing on said seat with its concave side facing said one of said ports, said membrane being provided with peripheral cutouts normally enabling communication between said ports but blocking said communication upon a deflection of a marginal membrane portion against said seat in response to an abnormal pressure differential across said membrane, and a plug carried centrally on said membrane opposite said one of said ports for penetration of the latter and frictional retention therein upon a substantially complete flattening of said membrane against said seat.

14. A safety valve inserted between a main conduit and several branch conduits of a fluid system, comprising a valve chamber with an inlet port and several outlet ports respectively connected to said main and branch conduits, said chamber having an inner wall forming a seat around each of said outlet ports, and a plurality of generally cup-shaped membranes of resilient material in said chamber each bearing on a respective seat with its concave side facing the corresponding outlet port, said membrane being provided with peripheral cutouts normally enabling communication between said inlet and corresponding outlet ports but blocking said communication upon a deflection of a marginal membrane portion against said respective seat in response to an abnormal pressure differential across said membrane.

References Cited by the Examiner

UNITED STATES PATENTS

| | | | |
|---|---|---|---|
| 2,404,578 | 7/1946 | Liska | 137—525 XR |
| 2,674,262 | 4/1954 | Bradshaw | 137—525 XR |
| 2,936,790 | 5/1960 | Dahl et al. | 138—46 |
| 3,173,445 | 3/1965 | Mitchell | 137—498 XR |

ALAN COHAN, *Primary Examiner.*

WILLIAM F. O'DEA, D. J. ZOBKIW, *Examiners.*